Dec. 17, 1935. F. H. MOREHEAD 2,024,945
LUBRICATED VALVE
Filed July 13, 1932 5 Sheets-Sheet 1
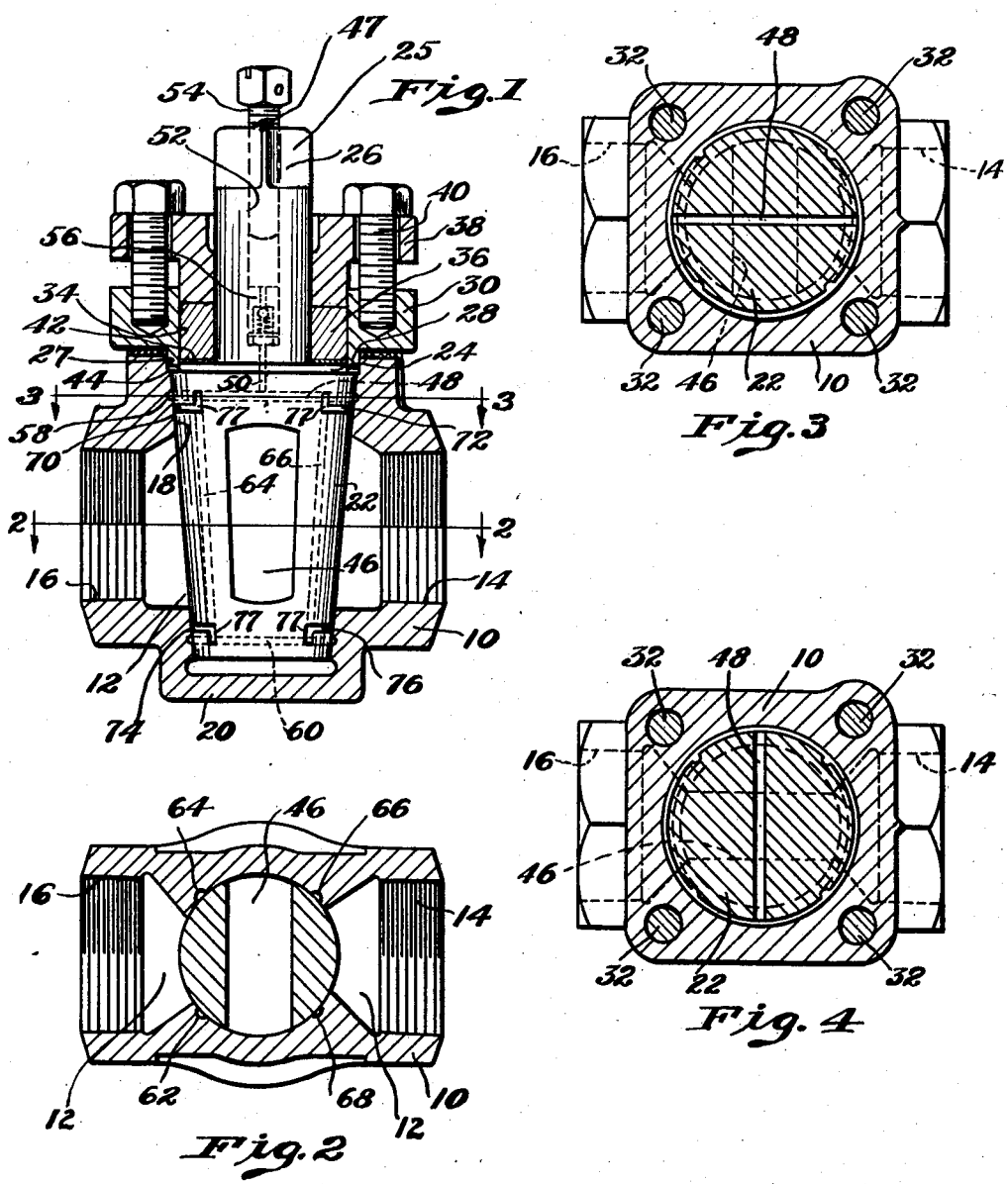
French H. Morehead
INVENTOR.
BY Albert J. Henderson
HIS ATTORNEY.

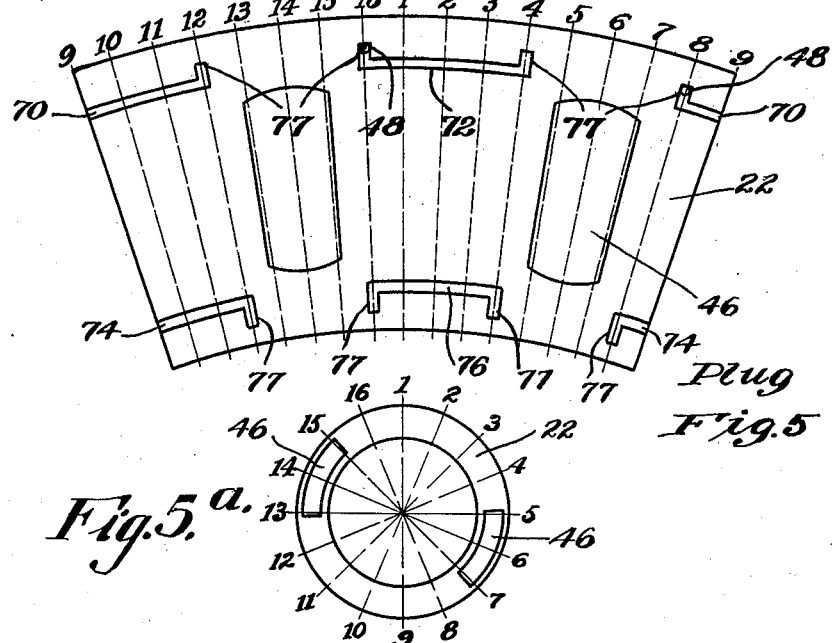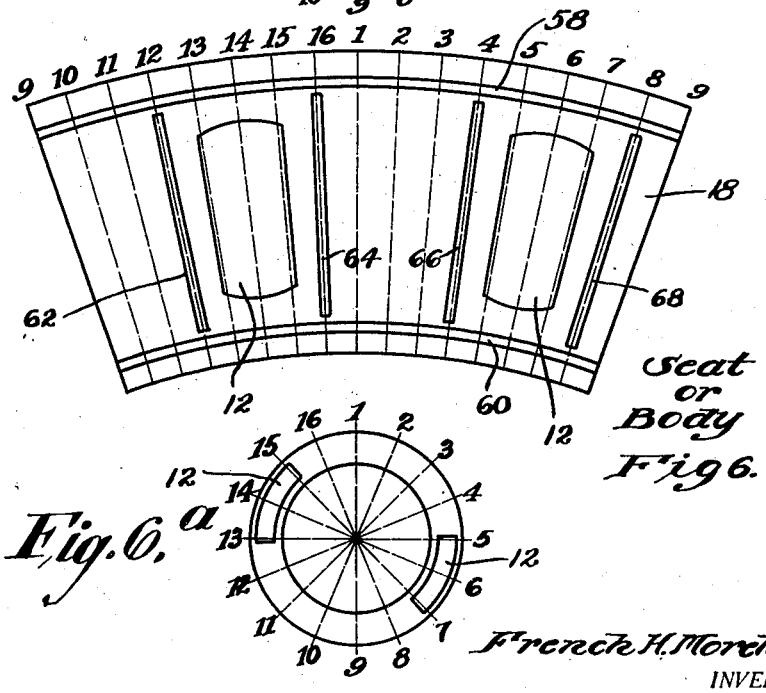

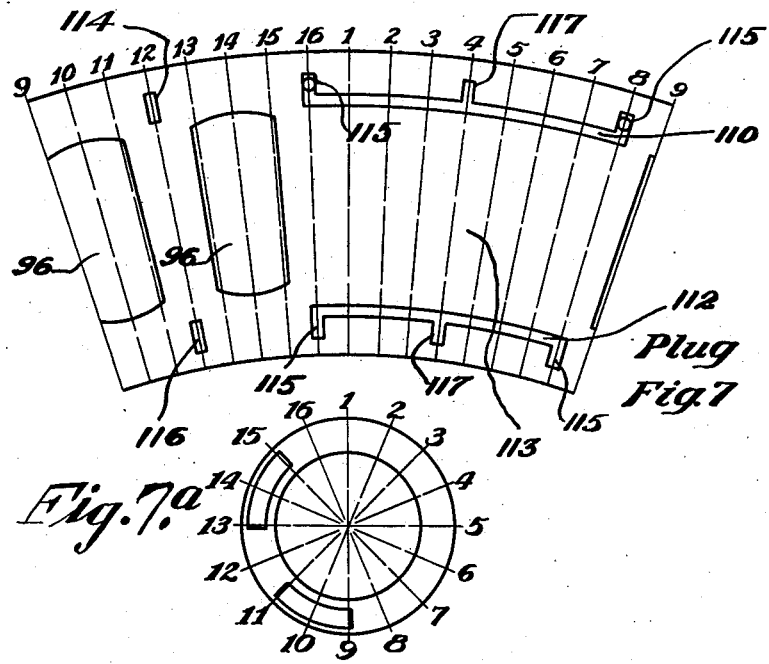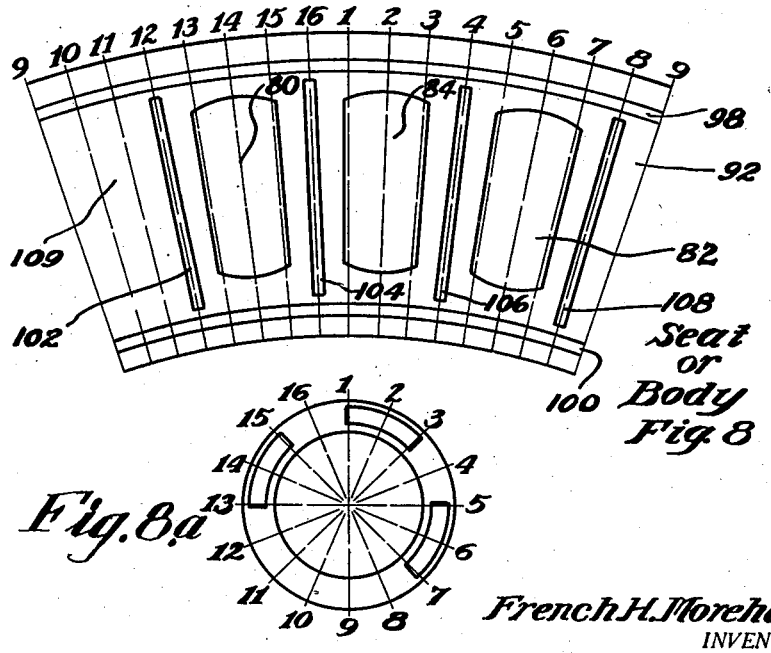

Dec. 17, 1935.  F. H. MOREHEAD  2,024,945
LUBRICATED VALVE
Filed July 13, 1932   5 Sheets-Sheet 4
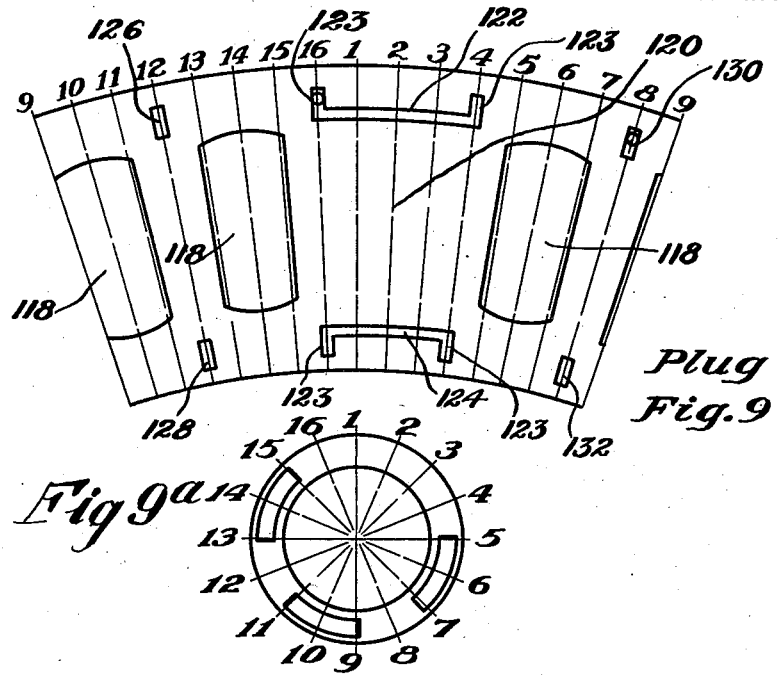
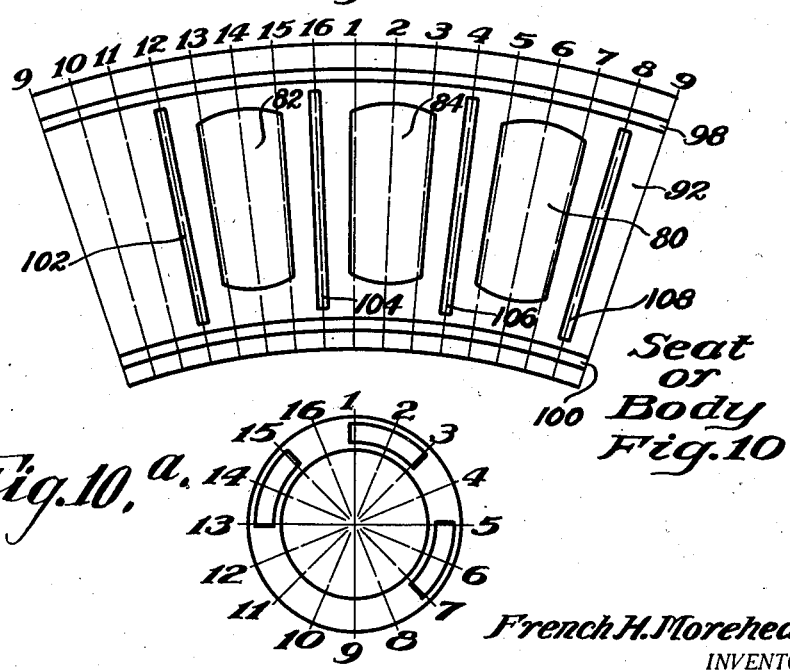
French H. Morehead
INVENTOR.
BY Albert J. Henderson
HIS ATTORNEY.

Dec. 17, 1935.                F. H. MOREHEAD                2,024,945
                              LUBRICATED VALVE
                            Filed July 13, 1932            5 Sheets-Sheet 5

French H. Morehead
INVENTOR.

BY Albert J. Henderson

HIS ATTORNEY.

Patented Dec. 17, 1935

2,024,945

UNITED STATES PATENT OFFICE 2,024,945

LUBRICATED VALVE

French H. Morehead, Hempfield Township, Westmoreland County, Pa., assignor to Walworth Patents Inc., Boston, Mass., a corporation of Massachusetts Application July 13, 1932, Serial No. 622,196

12 Claims. (Cl. 251—93)

This invention relates to lubricated valves and more particularly to improved means of supplying lubricant to the surface of contact of the valve member and its seat.

An object of this invention is to distribute lubricant adequately and continuously to the seating surface of lubricated valves.

Another object of this invention is to maintain a flow of lubricant between the source of supply and the seating surface most distant therefrom regardless of whether the valve is open or closed or in any position therebetween.

Another object of this invention is to frame the passageways of a valve when in certain positions with a seal of lubricant to prevent leakage.

Another object of this invention is to prevent the main body of lubricant contained in the valve from being exposed to the fluid from the pipe line during movement of the valve.

Another object of this invention is to prevent the fluid flowing through the valve from entering the lubricating system in any position of the valve member.

Another object of this invention is to so arrange the lubricating system that it will be equally effective on multi-port valves as on the ordinary straight-way type.

Another object of the invention is to prevent the exposure of the main body of the lubricant in the valve to the fluid from the pipe line without limiting the degree of rotation of the valve by stops or the like.

Other objects and advantages will become apparent from the following description taken in connection with the accompanying drawings wherein:—

Fig. 1 is a front view, partly the longitudinal section, of a valve embodying this invention.

Fig. 2 is a transverse sectional view taken on the line 2—2 of Fig. 1 looking in the direction indicated by the arrows.

Fig. 3 is a transverse sectional view taken on the line 3—3 of Fig. 1 looking in the direction indicated by the arrows and showing the valve member in the full closed position.

Fig. 4 is a view similar to Fig. 3 but showing the valve member in the full open position.

Fig. 5 is a geometrical development of the contacting surface of the valve member as shown in Fig. 1.

Fig. 5a is a corresponding end view of said valve member.

Fig. 6 is a geometrical development of the contacting surface of the valve body as shown in Fig. 1.

Fig. 6a is a corresponding end view of said valve body.

Figs. 7 and 8 are geometrical developments similar to Figs. 5 and 6 respectively, but showing the invention applied to a 2-port 3-way valve.

Figs. 7a and 8a are corresponding end views of the valve member and body respectively.

Figs. 9 and 10 are geometrical developments similar to Figs. 5 and 6 respectively, but showing the invention applied to a 3-port 3-way valve.

Figs. 9a and 10a are corresponding end views of the valve member and body respectively.

Figure 11:
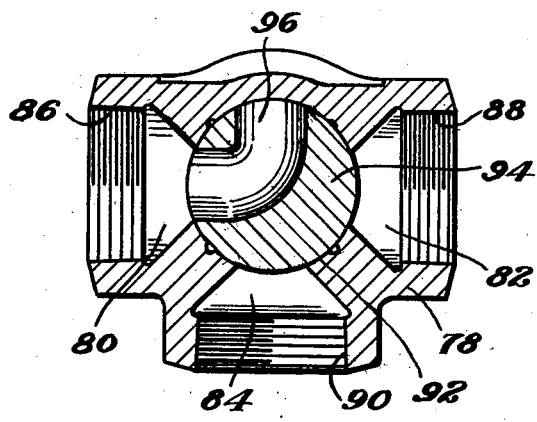

Fig. 11 is a transverse sectional view similar to Fig. 2, but showing the invention applied to a 2-port 3-way valve of which Figs. 7 and 8 are geometrical developments of the contacting surface of the valve member and body respectively.

Figure 12:
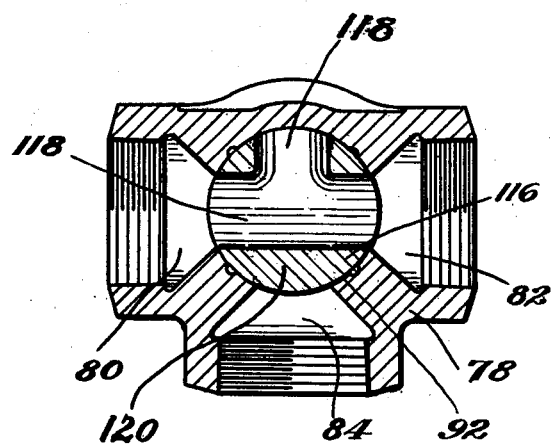

Fig. 12 is a transverse sectional view similar to Fig. 2 but showing the invention applied to a 3-port 3-way valve and of which Figs. 9 and 10 are geometrical developments of the contacting surface of the valve member and body respectively.

Referring more particularly to the drawings wherein similar characters of reference designate corresponding parts throughout the several views the valve structure shown in Figs. 1 to 6 inclusive comprises a body 10 having a passageway 12 for fluid provided at its terminal ends with threaded portions 14 and 16 by which the valve may be connected to a pipe line. It will be understood that other constructions could be used for this purpose, such as flanges, depending on the size of valve and nature of use.

The fluid passageway 12 is intersected by a longitudinal tapering valve seat 18 which is closed at its lower end by the cup shaped portion 20 formed on the body 10. Contacting with the valve seat 18 is a frusto-conical valve member 22 having a shoulder 24 at its upper or larger end and a reduced portion forming a valve stem 26 projecting therefrom. The valve may be conveniently rotated by the application of a wrench to the stem, the upper end of which is formed with a square section 25 for this purpose.

The upper end of the body 10 adjacent the valve seat 18 is preferably suitably recessed as at 27 for the reception of an annular flange 28 depending from a valve retaining plate 30 which may be secured to the body 10 as by means of the bolts 32. The plug retaining plate 30 is provided with a bore 34 which is sufficiently larger than the stem 26 to be spaced therefrom and thus form a stuffing box.

The valve member 22 is preferably resiliently held to its seat and for the purpose, and also to prevent leakage along the stem 26, there is provided an annular packing member 36 which is positioned within the stuffing box between the valve stem and the bore 34. The packing 36 is adjusted by means of the packing gland 38 which is movably positioned by the bolts 40 extending from the plug retaining plate 30. In order that the valve member 22 may be freely rotated without undue friction from the packing a thin metallic washer 42 is interposed between the surface of the shoulder 24 and the packing 36.
As previously stated, the valve member is preferably held resiliently to its seat and to permit a longitudinal movement of the valve member 22 a small space 44 is preferably left upon assembly between the face of the depending portion 28 and the upper surface of the valve member 22, the depending portion 28 preferably overlapping the shoulder 24 slightly. It will be understood that the packing 36 is formed of some compressible material, such as asbestos, and is prevented from being extruded from the stuffing box by the overlapping edges of the depending portion 28 and the shoulder 24. To provide a passage for fluid through the valve member 22 a port 46 is formed transversely there-through and so proportioned as to register with the passageway 12 in the body 10 when the valve member is in an open position. As some means is necessary to indicate the relative positions of the port 46 and passageway 12, a lug 47 is formed on the end of the stem 26 and extending parallel to the axis of the port 46.
This invention is more particularly directed to improvements in the lubricating system of valves, such as those of the type described, and to this end the valve member 22 is provided with an internal radial passage 48 adjacent its larger end and communicating with an axial perforation 50 extending therefrom into the stem 26. The axial perforation 50 communicates with an enlarged axial bore 52 forming a lubricant reservoir in the stem 26, the bore 52 being threaded for the reception of a lubricant compressor screw 54. In order to prevent a reflux of lubricant from the valve when the compressor screw 54 is removed, a check valve member 56 may be positioned in the lower portion of the reservoir 52.
The distribution of lubricant to the surface of contact of the valve member and its seat is accomplished by a novel arrangement of lubricant grooves formed in the seating surface and communicating with the radial passage 48. In the embodiment shown in Figures 1 to 6 inclusive the invention has been applied to a valve of the ordinary straightway type. Accordingly, a pair of continuous circumferential grooves 58 and 60 are formed in the seating surface 18 beyond the ends of the passageway 12.
The seating surface 18 is also provided with a plurality of longitudinal grooves, in this instance four grooves 62, 64, 66, 68 being utilized. These longitudinal grooves 62, 64, 66, 68 are spaced at substantially equal intervals around the surface 18 and are of such length that they do not communicate directly with the circumferential grooves 58 and 60 but terminate short thereof as shown in Fig. 6. The function of these longitudinal grooves however, is to form in conjunction with the circumferential grooves 58 and 60 a complete seal of lubricant around the port 46 and passageway 12 when the valve is in the open or closed position. These grooves are therefore located adjacent the sides of the passageway 12 as clearly shown in Fig. 6 with the openings of the passageway 12 spaced between opposite pairs of grooves 62, 64 and 66, 68.
The connection between the individual longitudinal grooves of the seating surface 18 is provided by a plurality of non-continuous circumferential grooves, four such grooves 70, 72, 74, 76 being conveniently shown in Fig. 5 as formed in the surface of the valve member 22 beyond the edges of the port 46 and lying between the sides thereof. The non-continuous circumferential grooves 70, 72, 74, 76 are preferably of such length that each will span any two of the longitudinal grooves 62, 64, 66, 68 when the valve member is rotated into either the full open or full closed positions and are arranged to overlap the terminal ends of the longitudinal grooves and to lie within the boundary defined between the complete circumferential grooves 58 and 60.
The connection between the longitudinal grooves and the complete circumferential grooves is provided by short longitudinally projecting grooves 77 extending from the terminal ends of the non-continuous grooves, 70, 72, 74, 76, those at the upper or larger end of the valve member being projected upwardly and those at the lower or smaller end of the valve member being projected downwardly into overlapping engagement with the complete circumferential grooves 58 and 60. The radial passage 48 may communicate at its ends with two opposite short grooves 77 as shown and thus establish communication between the reservoir and the grooves. The arrangement of all the various grooves with relation to the seating surface 18 and the contacting surface of valve member 22 is clearly shown in the geometrical development of the surfaces in Figures 5 and 6. The connection between the longitudinal and the complete circumferential grooves provided by the non-continuous grooves is clearly shown in Fig. 1.
In the operation of device shown in Figures 1 to 6 inclusive the valve member 22 may be rotated into the closed position shown in Fig. 1 whereupon a complete seal of lubricant will be formed around the openings of the passageway 12. It will be observed there is also a complete seal of lubricant around the openings of port 46 and that when the valve member is rotated into the full open position shown in Fig. 4 there will again be a complete seal of lubricant around the port 46 and passageway 12. Moreover, although during the time that the valve member 22 is being rotated one or more of the longitudinal grooves will be exposed to the fluid in the line, there is a complete disconnection between the longitudinal groove or grooves exposed and the continuous circumferential grooves 58 and 60.
In the construction shown in Figures 1 to 6, it will be noted that two of the longitudinal grooves will be exposed to the fluid in the line when the valve is rotated and that these grooves are automatically disconnected from the continuous circumferential grooves by the movement of the non-continuous circumferential grooves in the valve member 22. However, lubricant will constantly be conveyed to the seating surface by the remaining two longitudinal grooves in this construction, regardless of the position of the valve member 22, as one longitudinal groove is always connected to each non-continuous circumferential groove, as will be apparent.
This invention is not confined to the straightway type of valve shown in Figures 1 to 6 inclusive, but may be applied with equal facility to the type of valve having a transverse port in the valve member and a plurality of ports in the valve body commonly termed a 2-port 3-way valve. As an illustration, reference may be made to Figures 7, 8 and 11, wherein the invention is shown as applied to such a 2-port 3-way valve. This type of valve is usually constructed as shown in Fig. 11, which is a similar view to that in Fig. 2, being a transverse sectional view through a 2-port 3-way valve having structural features similar to that shown in Fig. 1, but being provided with a body 78 having a pair of transverse fluid passageways 80 and 82 and a third fluid passageway 84 positioned substantially normal thereto. The terminal ends of each of these passageways may be threaded as at 86, 88, 90 for connection to a pipe line or the ends may be flanged or otherwise constructed to effect such connection.

The body 78 may be provided with a tapered seating surface 92 in contact with which is disposed a frusto-conical valve member 94. In this instance, the valve member 94 is provided with a port 96 of angular formation and adapted to register with any two adjacent ports, such as 80 and 84 or 84 and 82. The grooving arrangement is slightly modified in this construction to accomplish the features described in connection with Figures 1 to 6 inclusive.

In this instance, the seating surface 92 on the body 78 is provided, as shown in Fig. 8 with a pair of continuous circumferential grooves 98 and 100 disposed above and below the margins of the passageways 80, 82 and 84. A plurality of longitudinal grooves 102, 104, 106, 108 terminating short of the continuous circumferential grooves 98 and 100 are located one between each of the passageways 80, 84, 82, a blank space 109 being present between the grooves 108 and 102, as clearly shown in the geometrical development in Fig. 8.

The valve member 94, as shown in the geometrical development Fig. 7, has a pair of non-continuous circumferential grooves 110, 112 located above and below the margins of the ports 96 but being formed in the blank space 113, between these ports.

The terminal ends of the non-continuous grooves 110, 112 are provided with longitudinal extending projections 115, and a short longitudinal groove 117 is also formed in the intermediate portion of these non-continuous grooves. Formed in the space immediately between the openings of the port 96 is a pair of short longitudinal grooves 114, 116, which are of similar size to the projections 115 on the ends of the non-continuous grooves 100, 112. It will be apparent however, that complete sealing of the ports and passageway may be effected without the grooves 117, although these short grooves 117 arranged as shown, shorten the path of lubricant in certain positions of the valve member.

The sealing effected by the grooving arrangement shown in Figs. 7, 8 and 11, is similar to that previously described in connection with the straightway type of valve. There will be a complete seal around each passageway in the body 78 and around the port in the valve member 94 whether the valve is in a full open or a full closed position. There is also a disconnection between the longitudinal grooves which are exposed to the fluid in the passageway during rotation of the valve member while two of the longitudinal grooves will be connected at all times to the circumferential grooves 98 and 100. These circumferential grooves 98 and 100 are thus connected together at all times and continuously receive lubricant for distribution to any part of the seating surface.

As a further alternative form of the invention, there is shown in Figs. 9, 10 and 12 the application of the lubricant system to a 3-port 3-way valve. Fig. 12 is a view similar to that shown in Fig. 2, being a transverse sectional view through a 3-port 3-way valve having structural features similar to that shown in Fig. 1. In this embodiment however, the body is similar to the body 78 in Fig. 11 and similar reference numerals have been used to designate the similar parts shown in Figs. 10 and 12. The valve member 116 however, which engages the seating surface 92 has a T-shaped port 118 adapted to register with all 3-ports, 80, 82 and 84. This T-shaped port 118 may also register with any two adjacent ports 80, 84 or 84, 82 or it may further register with the ports 80 and 82, as in the position shown in Fig. 12.

As shown in the geometrical development of the valve member 116 in Fig. 9 a pair of non-continuous circumferential grooves 122—124 are disposed in the blank space or solid portion 120 between the ends of the port 118 and provided with projecting terminal end portions 123, for connection with the continuous circumferential grooves 98 and 100 of the seating surface 92 Fig. 10. Located between the openings of the T-shaped port 118 in the valve member 116 are short longitudinal grooves 126—128—130—132 which will connect the longitudinal grooves in the seating surface 92 with the continuous circumferential grooves 98 and 100 according to the position of the valve member. In this embodiment one longitudinal groove is always connected to the continuous circumferential grooves, regardless of the position of the valve member, although the longitudinal grooves which are exposed to the fluid in the line during rotation of the valve member are disconnected. There is also a complete seal around the T-shaped port and the passageways in the body when the valve is in the open position or in the closed position.

In all the embodiments shown it will be apparent that as the longitudinal grooves become exposed during rotation of the valve member to fluid in the line they are automatically cut off from communication with the lubricant reservoir. This feature renders the use of stops or other rotation limiting devices unnecessary, although stops may be desirable particularly on the multi-port valves. Some position indicating means is, of course, necessary on these valves and an exemplary embodiment 47 is shown in Fig. 1.

Although the lubricating groove arrangement has been specifically defined with relation to the seating surface of the valve body and the engaging surface of the valve member, it will be understood that the position of these grooves could readily be reversed if desired and that this invention is not limited to the location of specific grooves in either the valve body or the valve member.

From the foregoing description, it will be apparent that simple means have been provided whereby a complete framing of the port and passageways of a valve structure has been accomplished and at the same time wastage of lubricant is prevented by reason of the disconnection of exposed lubricant grooves from the source of supply. It will also be apparent that there is always a continuous flow of lubricant from the source of supply to the seating surface most distant therefrom, regardless of whether the valve is in the open or closed or any intermediate position there-between.

I claim:—

1. A valve structure comprising a body having a valve seat, a valve member engaging said seat, a lubricant inlet in said valve structure, means for conducting lubricant to the surface of contact of the valve and seat, including continuous grooves in said surface, and longitudinal grooves in said surface terminating short of said continuous grooves and adapted for communication with said first mentioned grooves in certain positions of the valve member and for non-communication upon movement of the valve member from such positions, but said communication being constantly maintained by at least one of said longitudinal grooves in all positions of the valve member.

2. A valve structure comprising a body having a valve seat, a plug valve member engaging said seat, a lubricant inlet in said valve structure, means for conducting lubricant to the surface of contact of the valve and seat, including continuous circumferential grooves in said surface, and longitudinal grooves in said surface terminating short of said circumferential grooves and adapted for communication with said first mentioned grooves in certain positions of the valve member and for non-communication upon movement of the valve member from such positions, but said communication being constantly maintained by at least one of said longitudinal grooves in all positions of the valve member.

3. A valve structure comprising a body having a valve seat, a valve member engaging said seat, a lubricant inlet in said valve structure, means for conducting lubricant to the surface of contact of the valve and seat, including continuous grooves in said surface and longitudinal grooves in said surface terminating short of said continuous grooves and adapted for communication with said first mentioned grooves to completely frame the ports in both the open and closed positions of the valve member and for non-communication upon movement of the valve member from such positions, but said communication being maintained by at least one of said longitudinal grooves in all positions of the valve member.

4. A valve structure comprising a body having a valve seat, a valve member engaging said seat, said body having fluid passageways and said valve member having a port adapted to register with said passageways in the open position of the valve, a lubricant inlet in said valve structure, means for conducting lubricant to the surface of contact of the valve and seat, including continuous circumferential grooves in said surface, longitudinal grooves in said surface terminating short of said circumferential grooves, and means for establishing communication between the longitudinal and circumferential grooves to completely frame the port in both the open and closed positions of the valve member and for breaking said communication with the longitudinal grooves which may be exposed to the fluid in the passageways upon movement of the valve member, said communication being constantly maintained with at least one of said longitudinal grooves in all positions of the valve member.

5. A valve structure comprising a body having a valve seat, a valve member engaging said seat, a lubricant inlet in said valve structure, means for conducting lubricant to the surface of contact of the valve and seat, including continuous circumferential grooves in said surface, longitudinal grooves in said surface terminating short of said circumferential grooves, and non-continuous circumferential grooves in said surface having projections thereon adapted to establish communication between the longitudinal and the continuous circumferential grooves.

6. A valve structure comprising a body having a valve seat, a valve member engaging said seat, a lubricant inlet in said valve structure, means for conducting lubricant to the surface of contact of the valve and seat, including continuous circumferential grooves in said surface, longitudinal grooves in said surface terminating short of said circumferential grooves, and non-continuous circumferential grooves in said surface having longitudinally extending projections thereon adapted to establish communication between the longitudinal and the continuous circumferential grooves.

7. A valve structure comprising a body having a valve seat, a valve member engaging said seat, said body having a fluid passageway and said valve member having a port adapted to register with said passageway in the open position of the valve, a lubricant inlet in said valve structure, means for conducting lubricant to the surface of contact of the valve and seat, including continuous circumferential grooves in said surface, longitudinal grooves in said surface terminating short of said circumferential grooves, and non-continuous circumferential grooves in said surface having projections thereon adapted to establish communication between the longitudinal and the continuous circumferential grooves to completely frame the port in both the open and closed positions of the valve member.

8. A valve structure comprising a body having a valve seat, a valve member engaging said seat, said body having a fluid passageway and said valve member having a port adapted to register with said passageway in the open position of the valve, a lubricant inlet in said valve structure, means for conducting lubricant to the surface of contact of the valve and seat, including continuous circumferential grooves in said surface, longitudinal grooves in said surface terminating short of said circumferential grooves, and non-continuous circumferential grooves in said surface having projections thereon adapted to establish communication between the longitudinal and the continuous circumferential grooves to completely frame the port in both the open and closed positions of the valve member, and for breaking said communication with the longitudinal grooves which may be exposed to the fluid in the passageway upon movement of the valve member, said communication being constantly maintained with at least one longitudinal groove in all positions of the valve member.

9. A valve structure comprising a body having a valve seat provided with passageways for fluid, a valve member engaging said seat and provided with a port adapted to register with said passageways when the valve member is in open position, a lubricant in said valve structure, means for conducting lubricant to the surface of contact of the valve and seat, including continuous circumferential grooves in said surface on each side of the port beyond the ends thereof, longitudinal grooves in said surface located on each side of each passageway and terminating short of said circumferential grooves, and means for establishing communication between the longitudinal and circumferential grooves to completely frame the port in both the open and closed positions of the valve member and for breaking said communication with the longitudinal grooves which may be exposed to the fluid in the passageways upon movement of the valve member, said communication being constantly maintained with at least one of said longitudinal grooves in all positions of the valve member.

10. A valve structure comprising a body having a valve seat provided with a pair of aligned transverse fluid passageways, a valve member engaging said seat and provided with a transverse port adapted to register with said passageways in the open position of the valve, a lubricant inlet in said valve structure, means for conducting lubricant to the surface of contact of the valve and seat, including continuous circumferential grooves in said surface on each side of the port beyond the ends thereof, longitudinal grooves in said surface located on each side of each passageway and terminating short of said circumferential grooves, and means for establishing communication between the longitudinal and circumferential grooves to completely frame the port in both the open and closed positions of the valve member and for breaking said communication with the longitudinal grooves which may be exposed to the fluid in the passageways upon movement of the valve member, said communication being constantly maintained with at least one longitudinal groove in all positions of the valve member.

11. A valve structure comprising a body having a valve seat provided with a pair of aligned transverse fluid passageways and a third fluid passageway substantially normal thereto, a valve member engaging said seat and provided with a transverse port adapted to register with two adjacent fluid passageways in the open position of the valve, a lubricant inlet in said valve structure, means for conducting lubricant to the surface of contact of the valve and seat, including continuous circumferential grooves in said surface on each side of the port beyond the ends thereof, longitudinal grooves in said surface located on each side of each passageway and terminating short of said circumferential grooves, and means for establishing communication between the longitudinal and circumferential grooves to completely frame the port in both the open and closed positions of the valve member and for breaking said communication with the longitudinal grooves which may be exposed to the fluid in the passageways upon movement of the valve member, said communication being constantly maintained with at least one longitudinal groove in all positions of the valve member.

12. A valve structure comprising a body having a valve seat provided with a pair of aligned transverse fluid passageways and a third fluid passageway substantially normal thereto, a valve member engaging said seat and provided with a T-shaped port adapted to register with said fluid passageways in the open position of the valve, a lubricant inlet in said valve structure, means for conducting lubricant to the surface of contact of the valve and seat, including continuous circumferential grooves in said surface on each side of the port beyond the ends thereof, longitudinal grooves in said surface located on each side of each passageway and terminating short of said circumferential grooves, and means for establishing commmunication between the longitudinal and circumferential grooves to completely frame the port in both the open and closed positions of the valve member and for breaking said communication with the longitudinal grooves which may be exposed to the fluid in the passageways upon movement of the valve member, said communication being constantly maintained with at least one longitudinal groove in all positions of the valve member.

FRENCH H. MOREHEAD.